(12) United States Patent
Milici

(10) Patent No.: US 12,668,077 B2
(45) Date of Patent: Jun. 30, 2026

(54) MULTI-PURPOSE ANALOGUE DEVICE FOR TRACING CURVES AND GEOMETRIC TRANSFORMATIONS

(71) Applicant: MACHINES4MATH S.R.L., Agrate Brianza (IT)

(72) Inventor: Pietro Milici, Agrate Brianza (IT)

(73) Assignee: MACHINES4MATH S.R.L., Agrate Brianza (IT)

( * ) Notice: Subject to any disclaimer, the term of this patent is extended or adjusted under 35 U.S.C. 154(b) by 372 days.

(21) Appl. No.: 18/579,258

(22) PCT Filed: Jul. 11, 2022

(86) PCT No.: PCT/IB2022/056377
§ 371 (c)(1),
(2) Date: Jan. 12, 2024

(87) PCT Pub. No.: WO2023/285940
PCT Pub. Date: Jan. 19, 2023

(65) Prior Publication Data

US 2024/0316981 A1 Sep. 26, 2024

(30) Foreign Application Priority Data

Jul. 14, 2021 (IT) ........................ 102021000018515

(51) Int. Cl.
*B43L 7/12* (2006.01)

(52) U.S. Cl.
CPC ...................................... *B43L 7/12* (2013.01)

(58) Field of Classification Search
CPC ........... B43L 7/12; B43L 13/045; G06G 3/02; G06G 3/08
See application file for complete search history.

(56) References Cited

U.S. PATENT DOCUMENTS

| | | | | |
|---|---|---|---|---|
| 115,318 A * | 5/1871 | Hickman | .................. | B43L 7/12 33/426 |
| 1,678,674 A * | 7/1928 | Koenig, Jr. | .............. | G06G 3/08 235/61 D |

(Continued)

FOREIGN PATENT DOCUMENTS

| | | |
|---|---|---|
| CN | 105059023 B | 1/2017 |
| CN | 107984941 B | 3/2019 |
| CN | 209191559 U | 8/2019 |

OTHER PUBLICATIONS

Search Report and Written Opinion for IT Application No. 202100018515 dated Mar. 30, 2022, 7 pages.

(Continued)

*Primary Examiner* — Yaritza Guadalupe-McCall
(74) *Attorney, Agent, or Firm* — NIXON & VANDERHYE

(57) ABSTRACT

It is provided a multi-purpose analogue device (1) for tracing curves and geometric transformations comprising a first guide (3) defining a first translation axis (3*a*) and movable on a tracing plane along a predetermined direction perpendicular to the first axis (3*a*), a second guide (4) integral to the first guide (3) defining a second translation axis (4*a*) perpendicular to the first axis (3*a*), a connector (5) configured to be connected to the guides (3, 4) and comprising a third guide (50) defining a third translation axis (5*a*), constrained in a compliant way and roto-translatable with respect to the second guide (4), a first slider (6) constrained in a compliant way to the first guide (3), movable along the first axis (3*a*) and including first movement means (60) configured to allow movement of the first slider (6) in the plane along a movement direction (6*a*), and support means (61) configured to track a mark on the plane or to support in contact with the plane tracking means, wherein the connector (5) further comprises a fourth guide (Continued)

Figure 1:
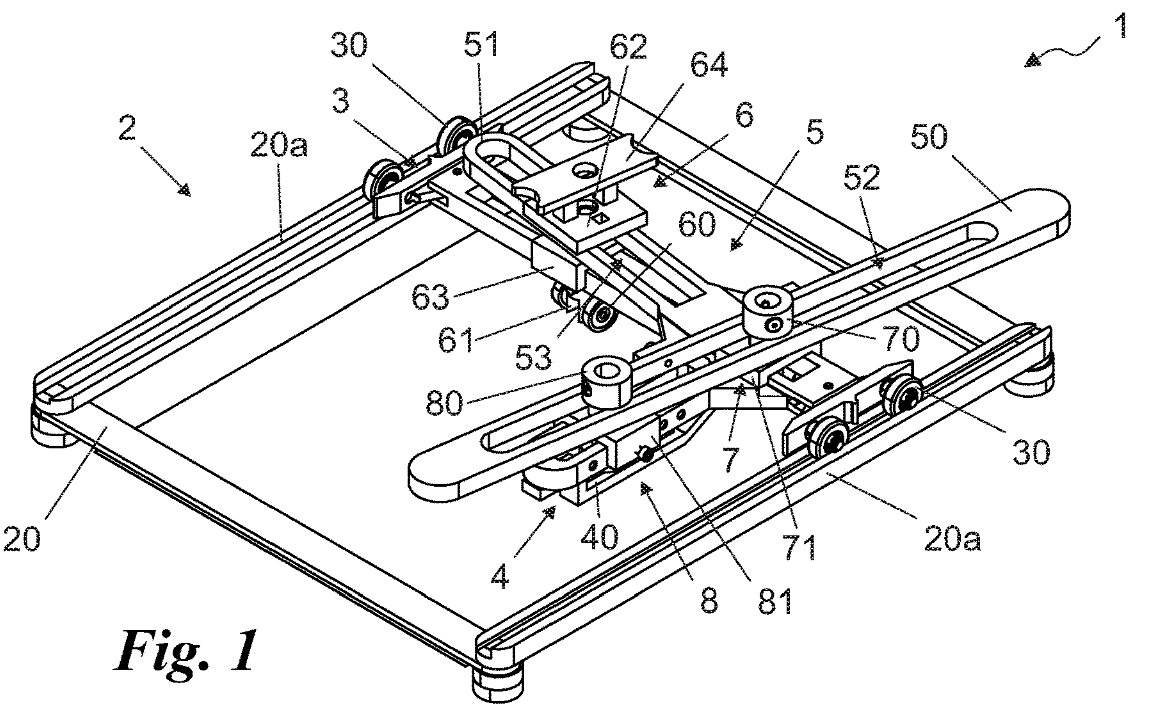

(51) defining a fourth translation axis (5*b*) and integrally constrained or integral, to the third guide (50) such that the translation axes (5*a*, 5*b*) are mutually perpendicular so as to allow for at least a first and second configuration in which the first slider (6) is also constrained in a compliant way respectively to the third guide (50) and translatable along the third axis (5*a*) or also to the fourth guide (51) and translatable along the fourth axis (5*b*).

11 Claims, 10 Drawing Sheets

(56) References Cited

U.S. PATENT DOCUMENTS

| | | | | |
|---|---|---|---|---|
| 2,033,715 | A * | 3/1936 | Jacob | G06G 3/08 33/441 |
| 2,128,834 | A * | 8/1938 | Mcgay | G06G 3/08 235/61 D |
| 2,210,938 | A | 8/1940 | Neal | |
| 2,210,939 | A | 8/1940 | Neal | |
| 2,212,323 | A | 8/1940 | Martin | |
| 2,393,474 | A * | 1/1946 | Jones | G01C 17/00 73/178 R |
| 2,463,788 | A * | 3/1949 | Mcguckin | G06G 1/00 33/472 |
| 3,053,445 | A | 9/1962 | Armstrong | |
| 4,075,762 | A * | 2/1978 | Ohtake | B43L 13/141 33/434 |
| 4,366,626 | A * | 1/1983 | Livick | G09B 21/002 33/494 |
| 4,872,267 | A * | 10/1989 | Anderton | G01B 5/24 33/463 |
| 6,327,929 | B1 * | 12/2001 | Yanagisawa | B23Q 5/40 248/661 |
| 6,609,304 | B1 * | 8/2003 | Mishler | F16C 29/0635 33/1 M |
| 2002/0152623 | A1 * | 10/2002 | Chen | B43L 13/045 33/430 |
| 2024/0316981 | A1 * | 9/2024 | Milici | B43L 13/045 |

OTHER PUBLICATIONS

International Search Report and Written Opinion of the ISA for PCT/IB2022/056377 dated Oct. 20, 2022, 14 pages.

* cited by examiner

MULTI-PURPOSE ANALOGUE DEVICE FOR TRACING CURVES AND GEOMETRIC TRANSFORMATIONS

This application is the U.S. national phase of International Application No. PCT/IB2022/056377 filed Jul. 11, 2022 which designated the U.S. and claims priority to IT patent application No. 102021000018515 filed Jul. 14, 2021, the entire contents of each of which are hereby incorporated by reference.

The present invention relates to a multi-purpose analogue device for tracing curves and geometric transformations of the type specified in the preamble to the first claim.

In particular, the present invention has as its object a device capable of tracing at least tracts of exponential and parabolic functions, as well as tracts also of inverse functions, integrals and derivatives given by the transformation of any function available, for example, on a support surface.

As is well known, over the years, many machines or devices have been developed that are capable of tracing, with relative precision, graphs of complex curves, such as exponentials and parabolas, or even transformations of functions into primitives or derivatives and therefore, for example, by integration or derivation.

The most common devices are, of course, digital devices. The latter are capable of transforming, for example, any equation into a graph shown on a display or, at the same time, showing graphs of function transformations.

Although extremely precise and high-performance, the digital devices have the major drawback of not being analogue and, therefore, not being very fun and interesting, especially for younger users.

Moreover, digital devices are, as is widely known, not very suitable for educational purposes as they oversimplify the work required by the user to arrive at the result, essentially preventing the user himself, or rather a student, from dwelling on the details that characterise the achievement of a specific function rather than a transformation.

Some analogue devices are, however, also known.

For example, among the most commonly used machines for graphing transforms are known to be integraphs.

The latter are devices that allow the integral curve of a given curve to be drawn by purely mechanical means. Thus, the integraphs are mostly made up of an articulated parallelogram connected to appropriate guides.

For example, the patent application SU-A-1539796 describes a mechanism comprising several rods and crossbars with connecting sliders that can be moved and rotated in such a way as to infuse the writing portion with movement.

Also known are planimeters, i.e. devices capable of describing, from a given closed curve in a plane, the area enclosed within the curve itself.

Other types of devices may, on the other hand, simply be able to draw the aforementioned complex curves.

For example, in the paper Semiotic potential of a tractional machine: a first analysis by Michela Maschietto, Pietro Milici and Dominique Tournès, a machine is described that is essentially equipped with a peripheral rectangular frame, a guide that slides along a predetermined direction on which a slider is constrained, sliding perpendicularly to the predetermined direction, and which allows the drawing of a curve.

The slider is thus equipped with a wheel that can be oriented perpendicularly or parallel to a rod to connect the slider with a fulcrum that can be moved parallel to the predetermined direction on an element protruding from the guide parallel to the predetermined direction.

The device thus makes it possible to manually draw either exponentials or parabolas simply by varying the inclination of the wheel with respect to the rod.

The analogue devices of the known technique described, however, also include some major drawbacks.

In particular, the integraphs and related devices include complex mechanisms that are difficult to adapt for purely educational purposes and often inefficient from the point of view of accuracy.

In addition, known analogue devices are often subject to breakage or misalignment during operation, which compromises their functionality. For example, the device described in the paper Semiotic potential of a tractional machine: a first analysis is subject to the slider slipping out of the guide, during handling, which prevents it from being used quickly and intensively.

In addition, all devices of the known technique are not really multi-purpose and are often dedicated to one or the other function and do not allow for function graphs and at the same time integrations and derivations.

In this situation, the technical task underlying the present invention is to devise a multi-purpose analogue device for tracing curves and geometrical transformations capable of substantially obviating at least part of the aforementioned drawbacks.

In the context of said technical task, it is an important scope of the invention to obtain a multi-purpose analogue device for tracing curves and geometric transformations which enables the tracing of functions, in this case at least exponentials and parabolas, as well as the tracing of transformations such as integrals and derivatives.

Another important aim of the invention is to realise a multi-purpose analogue device for tracing curves and geometric transformations which is simple, intuitive and extremely practical in such a way as to be efficiently employed for educational purposes.

Furthermore, a further task of the invention is to realise a multi-purpose analogue device for tracing curves and geometric transformations which is very stable and enables the graphs for which it is configured to be drawn extremely accurately.

In conclusion, a further task of the invention is to realise a multi-purpose analogue device for tracing curves and geometric transformations that is inexpensive and has few components.

The specified technical task and purposes are achieved by a multi-purpose analogue device for tracing curves and geometric transformations as claimed in the appended claim 1.

Preferred technical solutions are highlighted in the dependent claims.

Figure 2A:
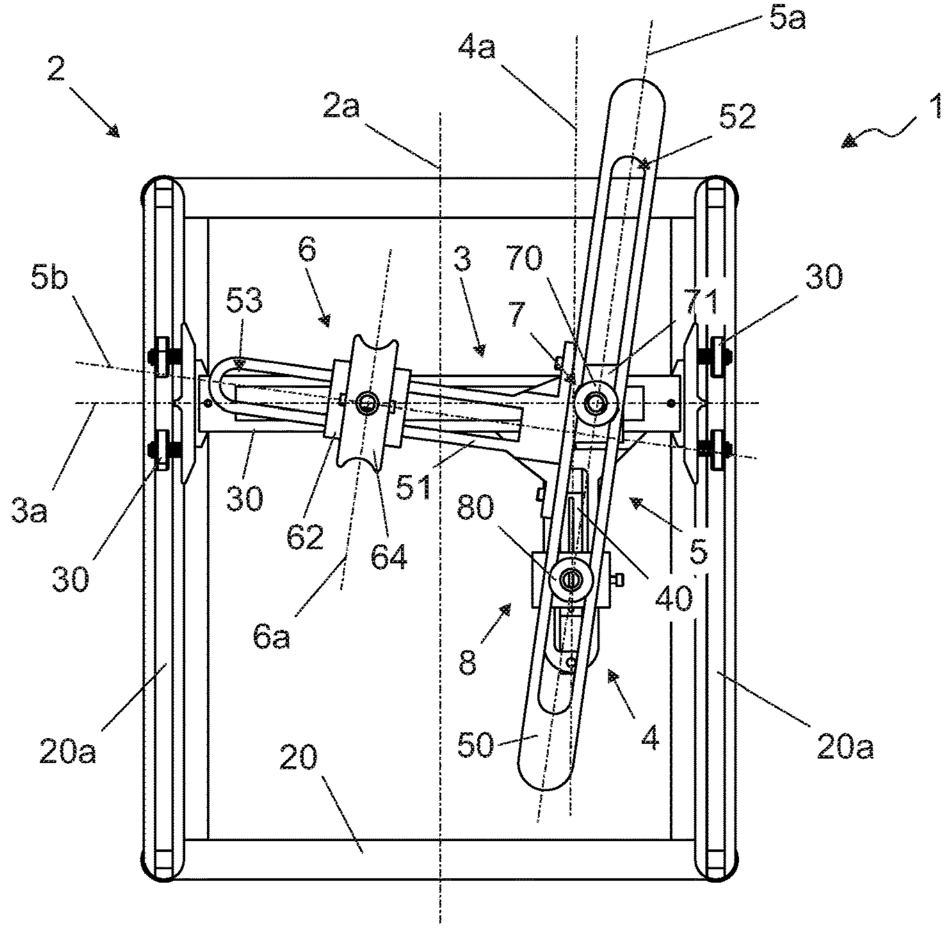
Figure 2B:
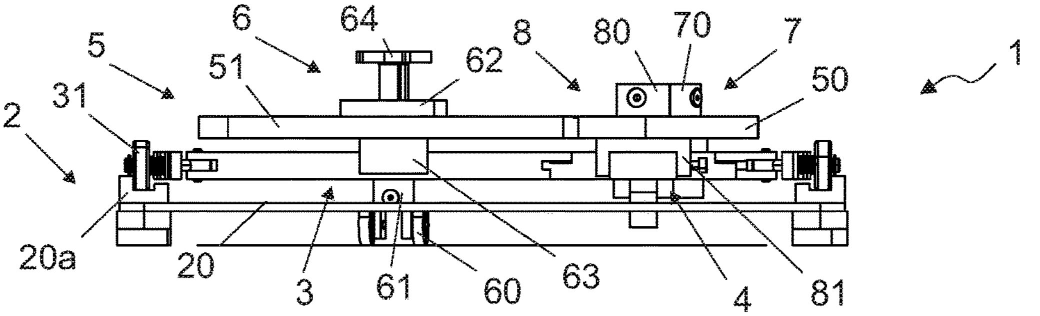
Figure 2C:
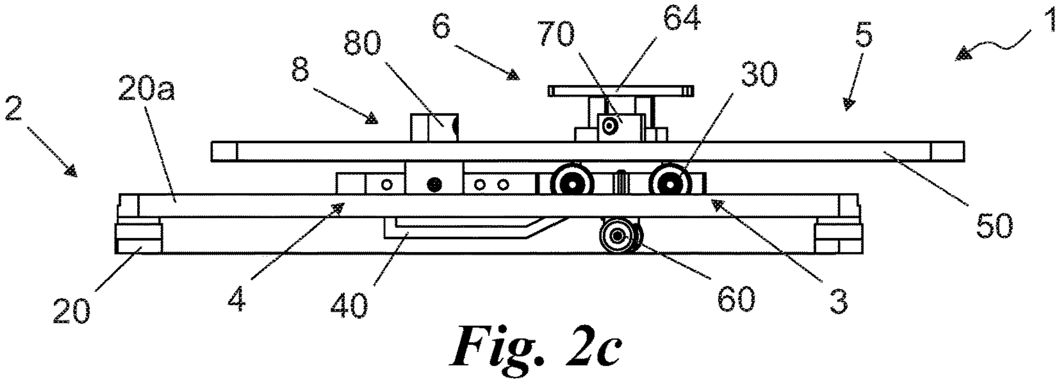
Figure 2D:
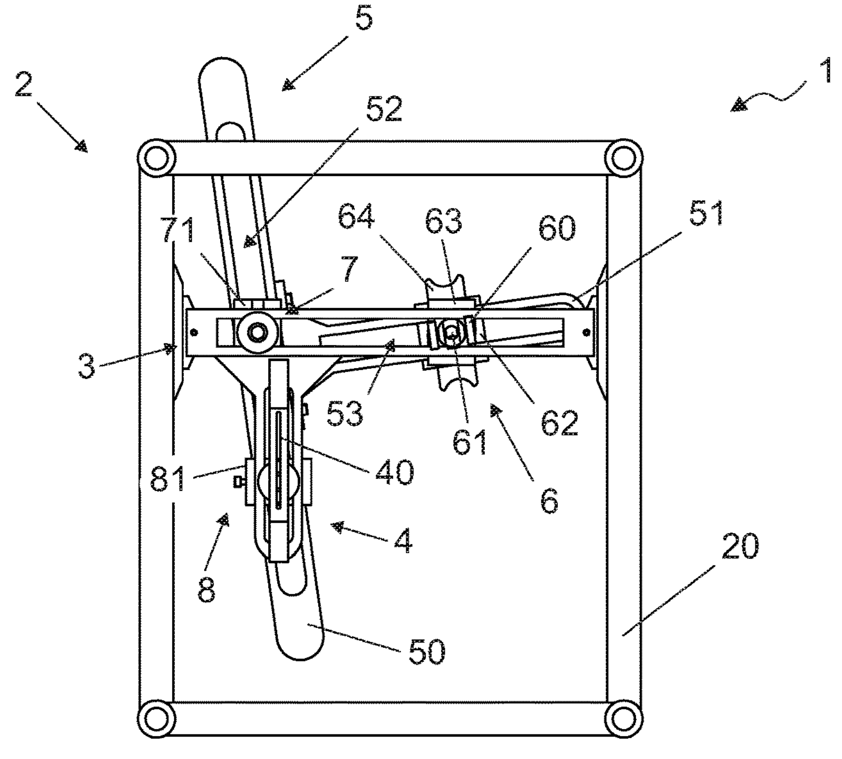
Figure 3:
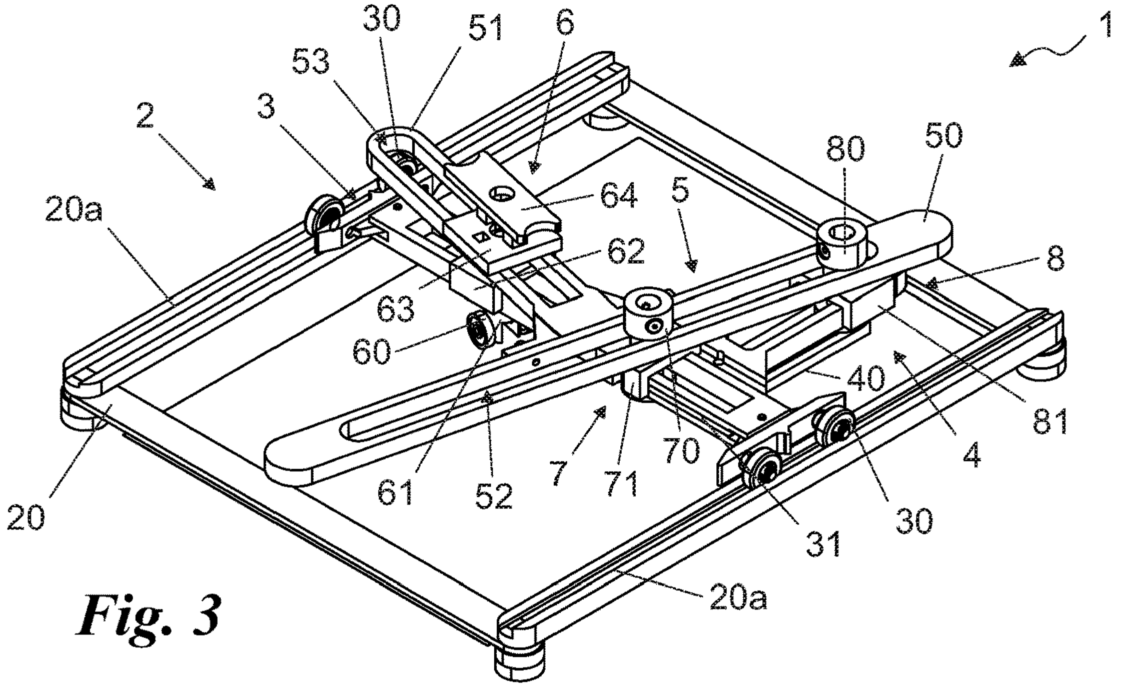
Figure 4A:
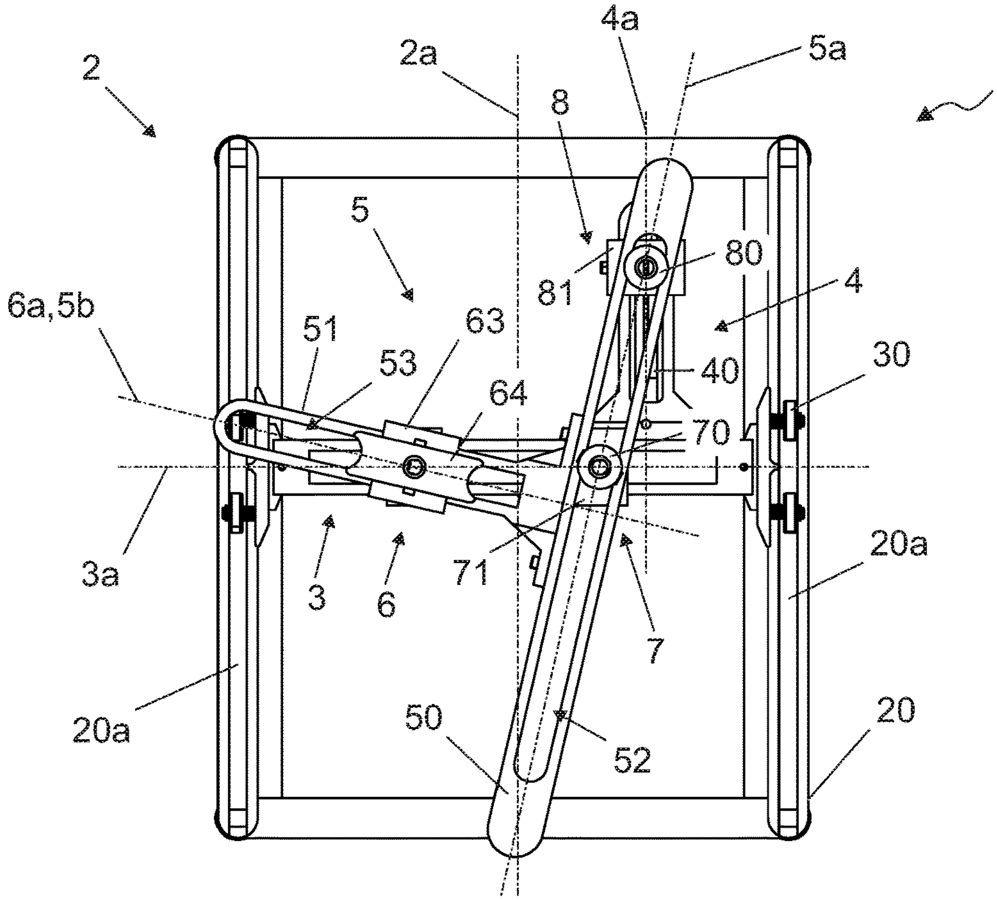
Figure 4B:
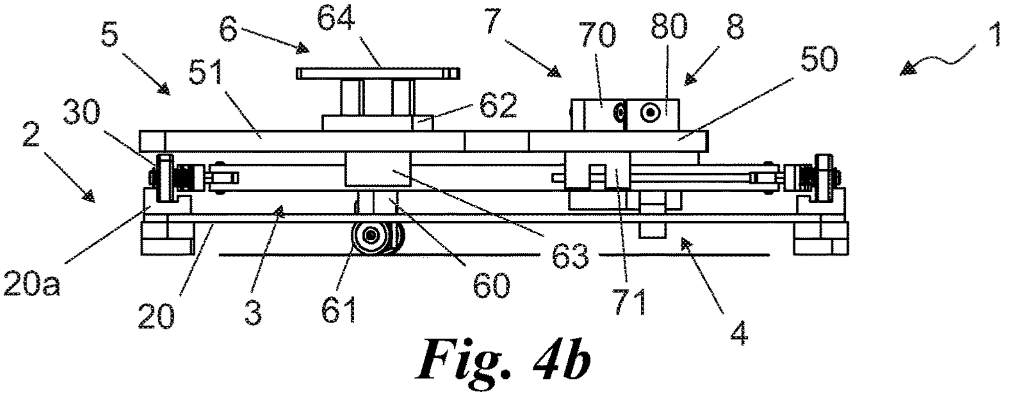
Figure 4C:
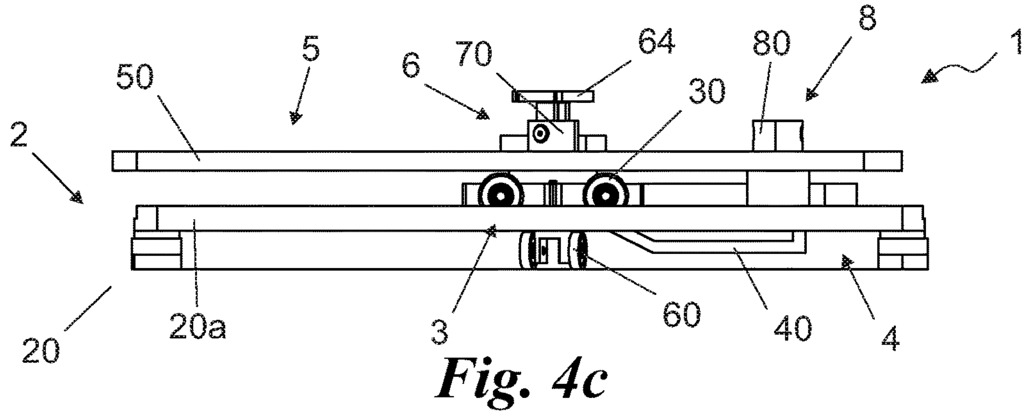
Figure 4D:
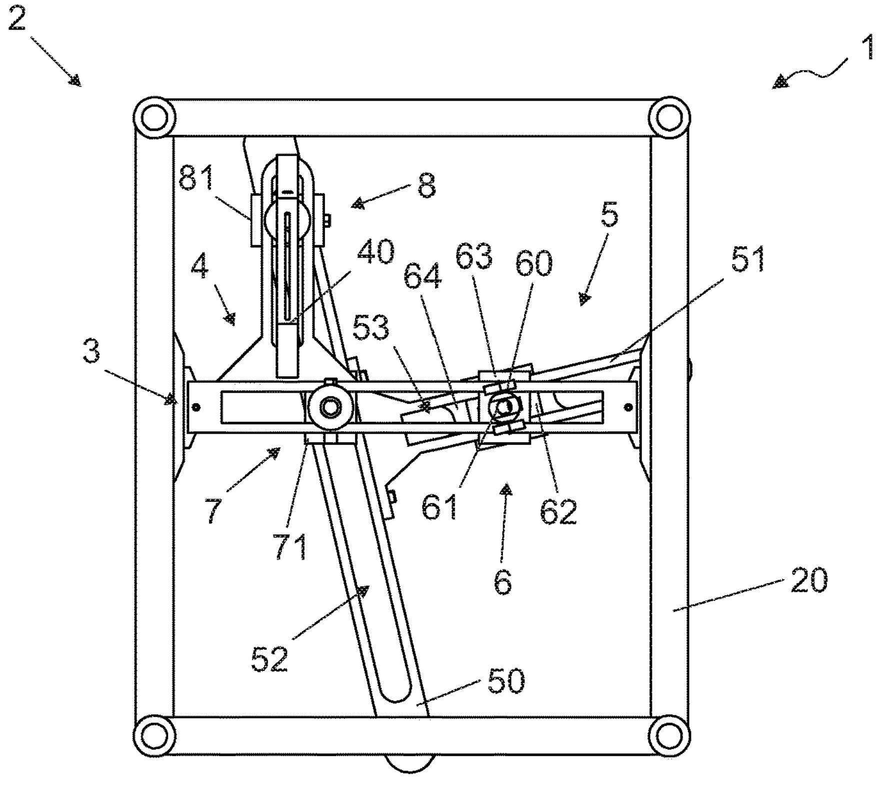
Figure 5:
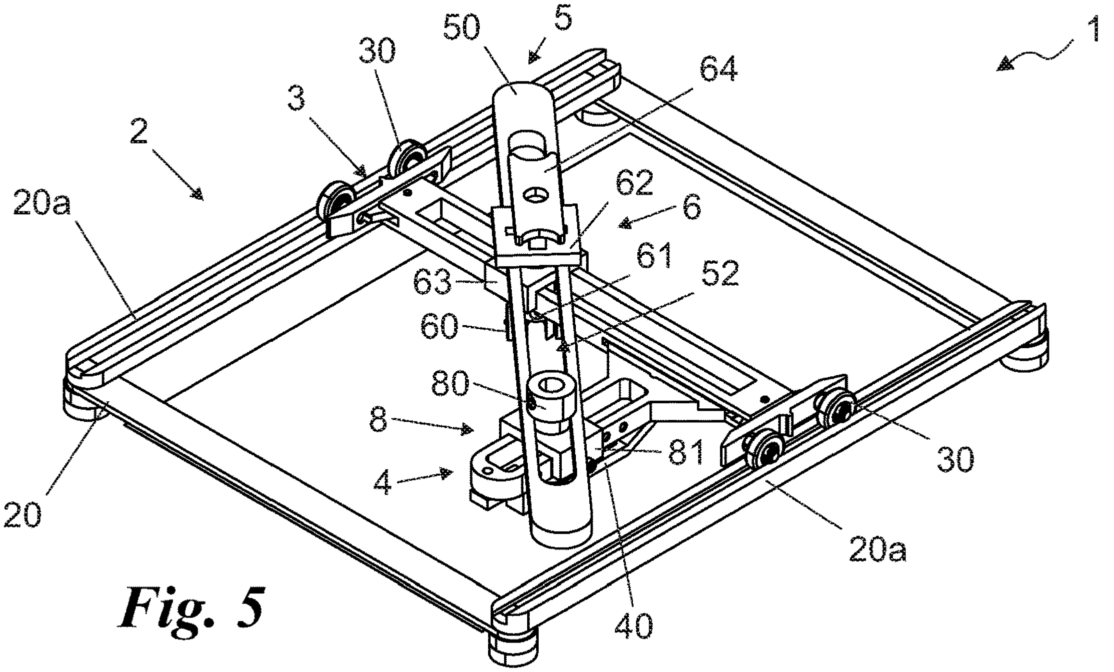
Figure 6A:
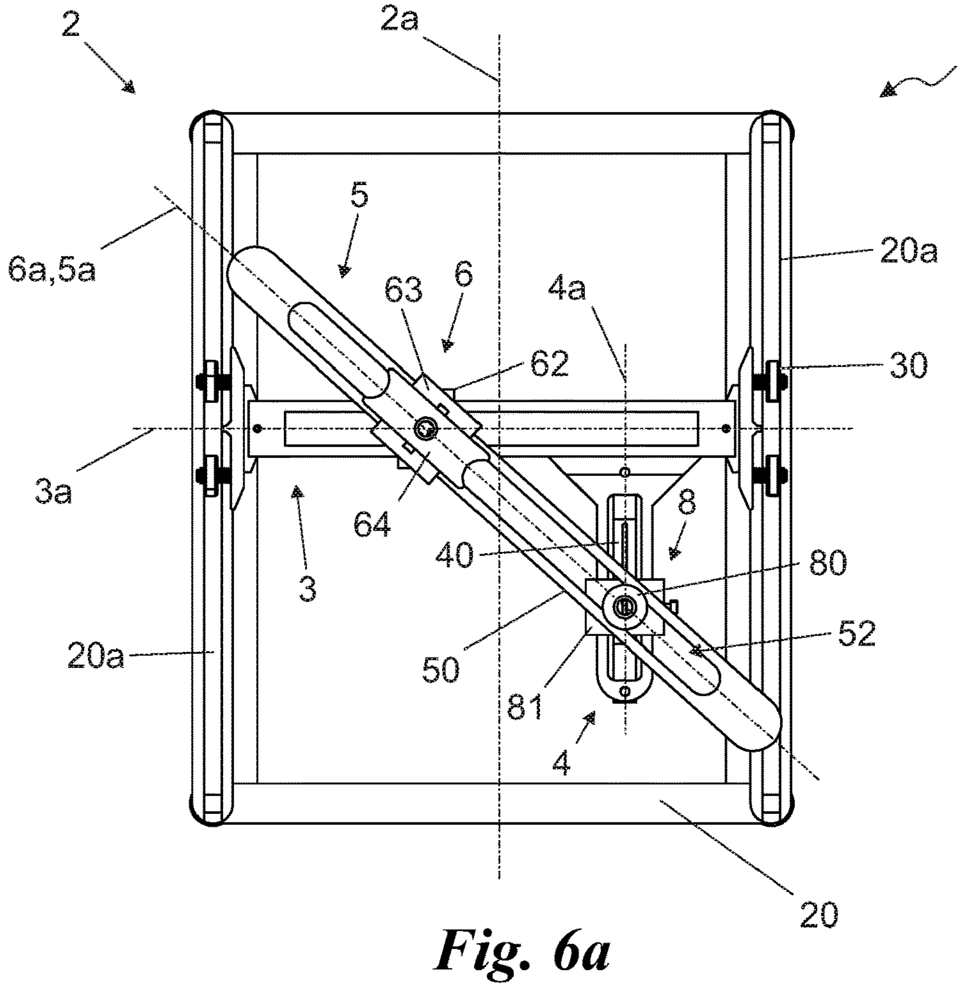
Figure 6B:
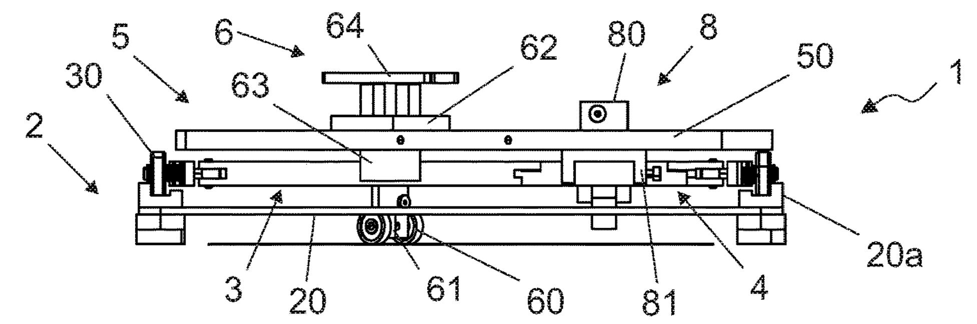
Figure 6C:
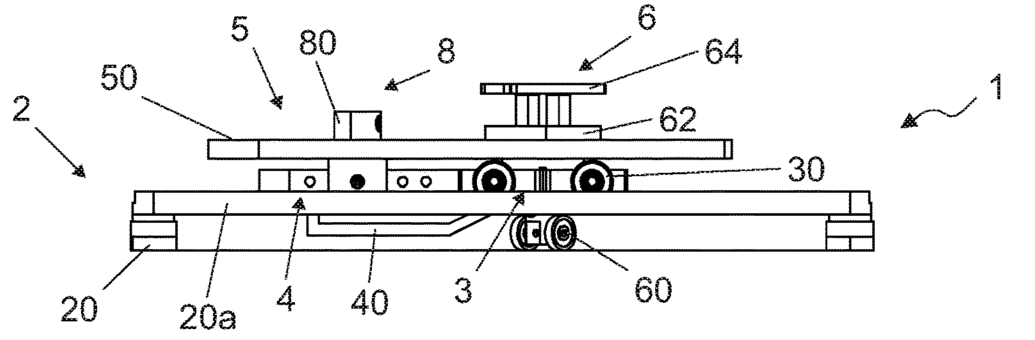
Figure 6D:
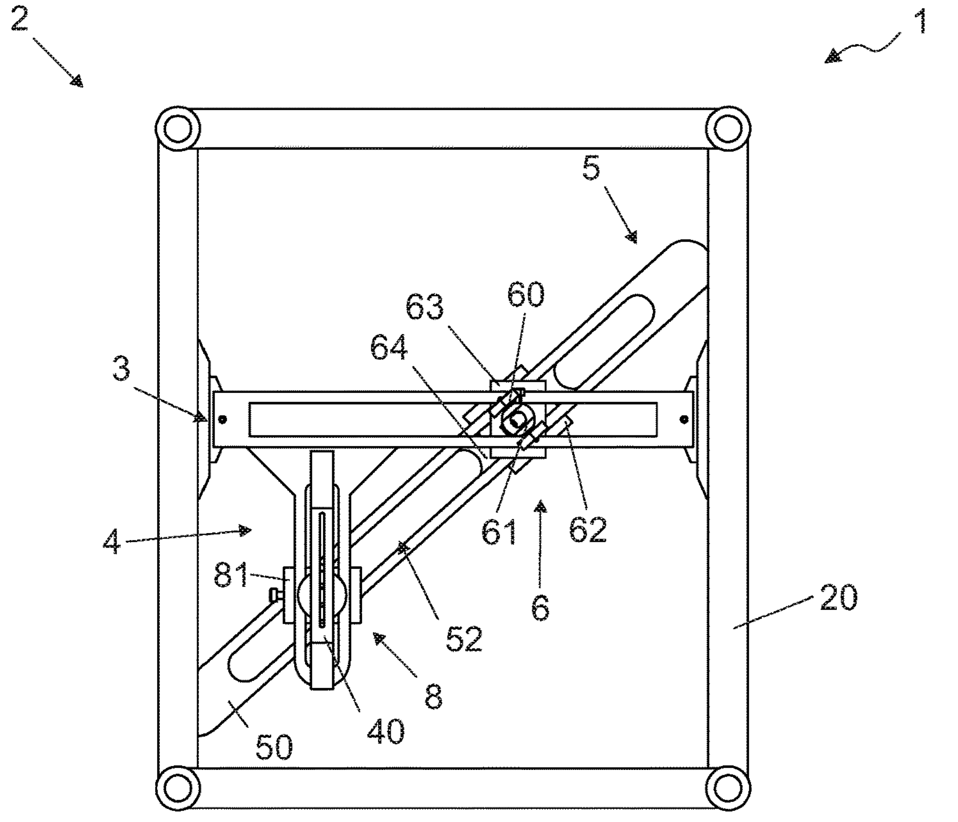
Figure 7:
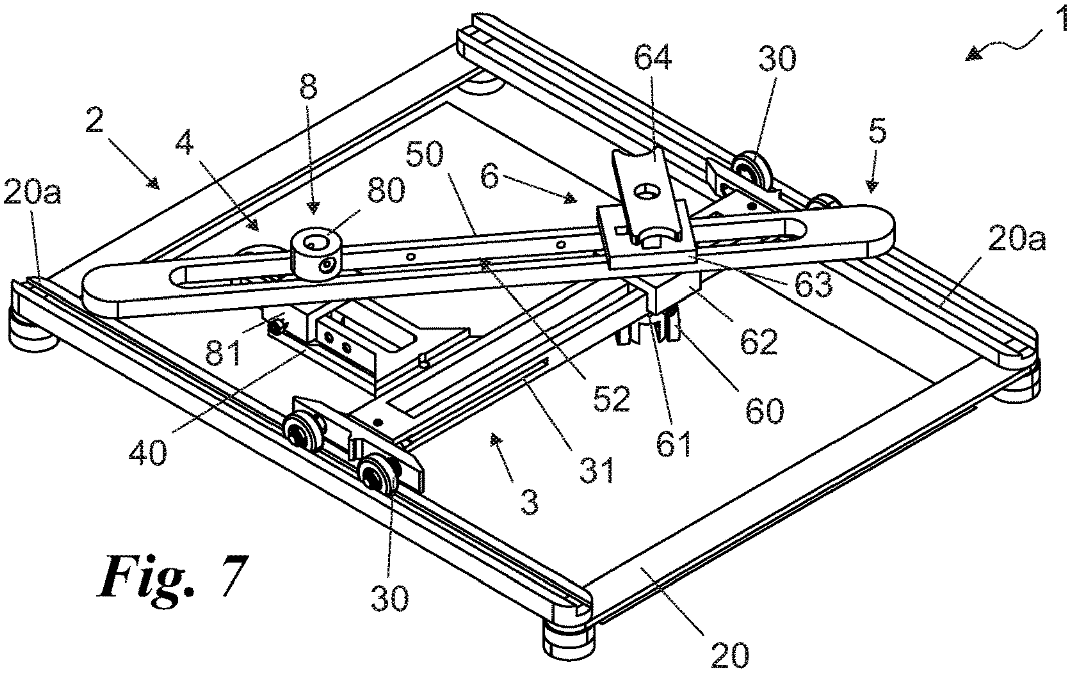
Figure 8A:
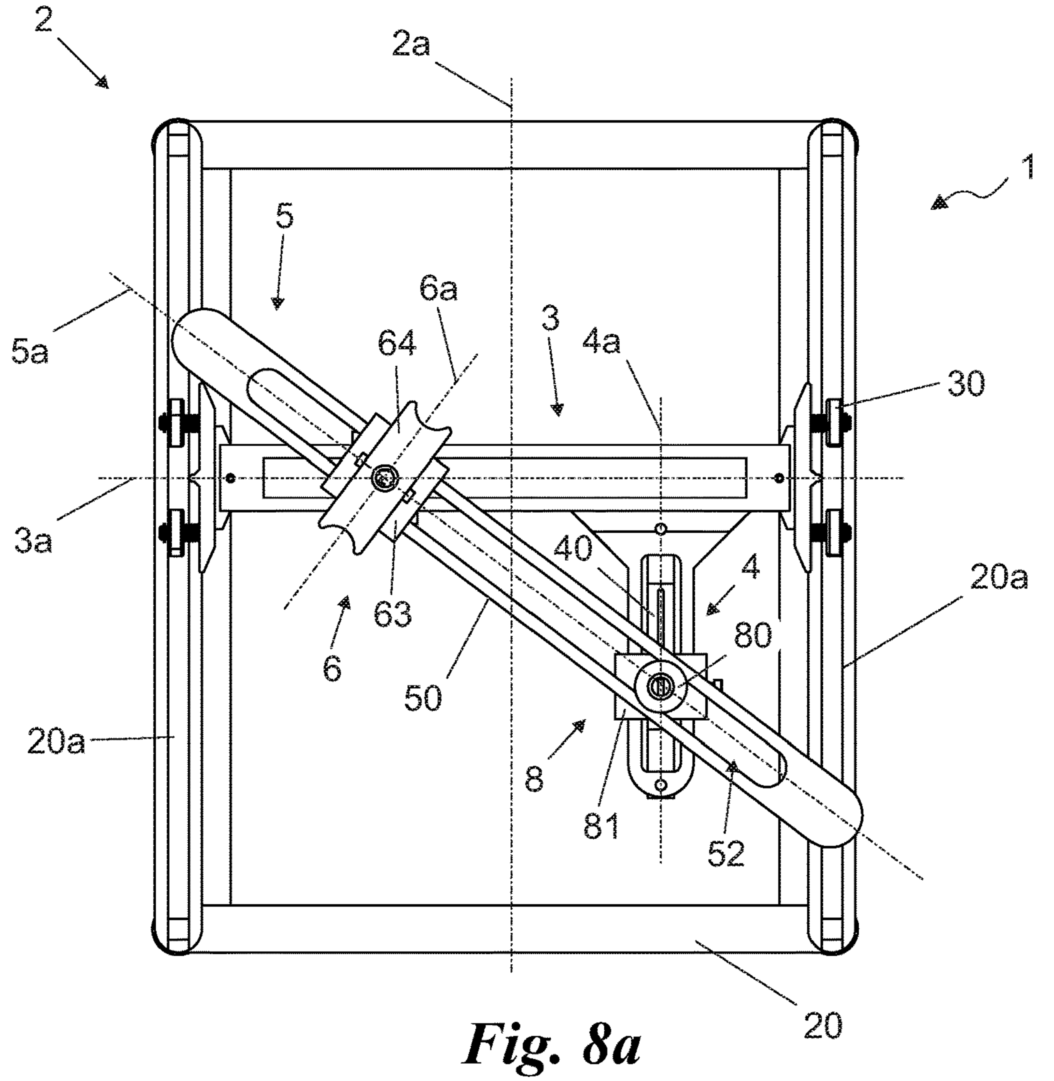
Figure 8B:
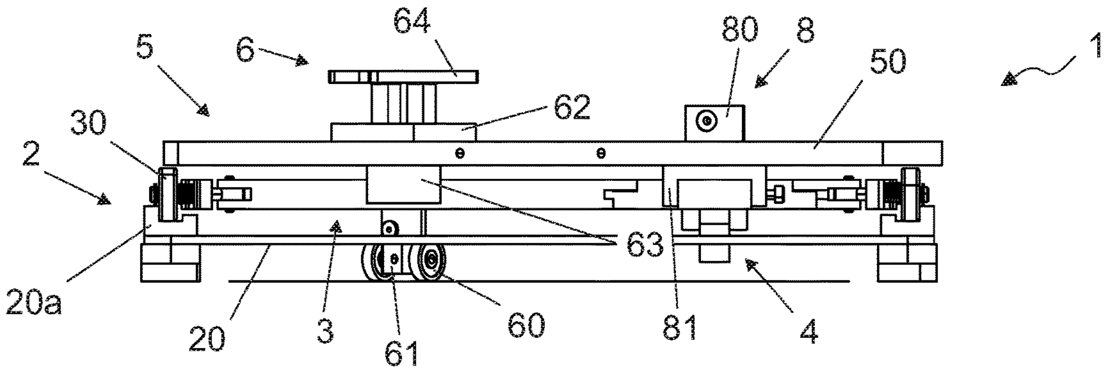
Figure 8C:
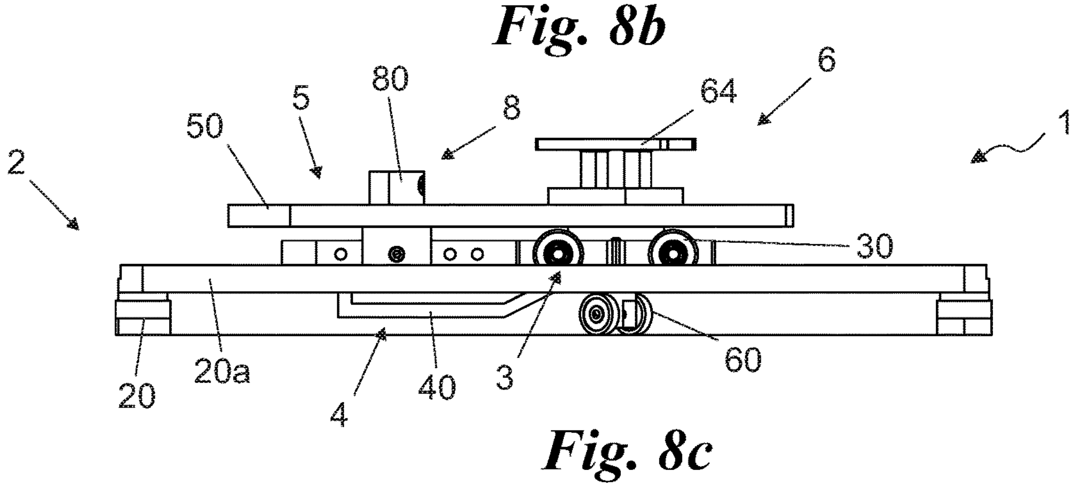
Figure 8D:
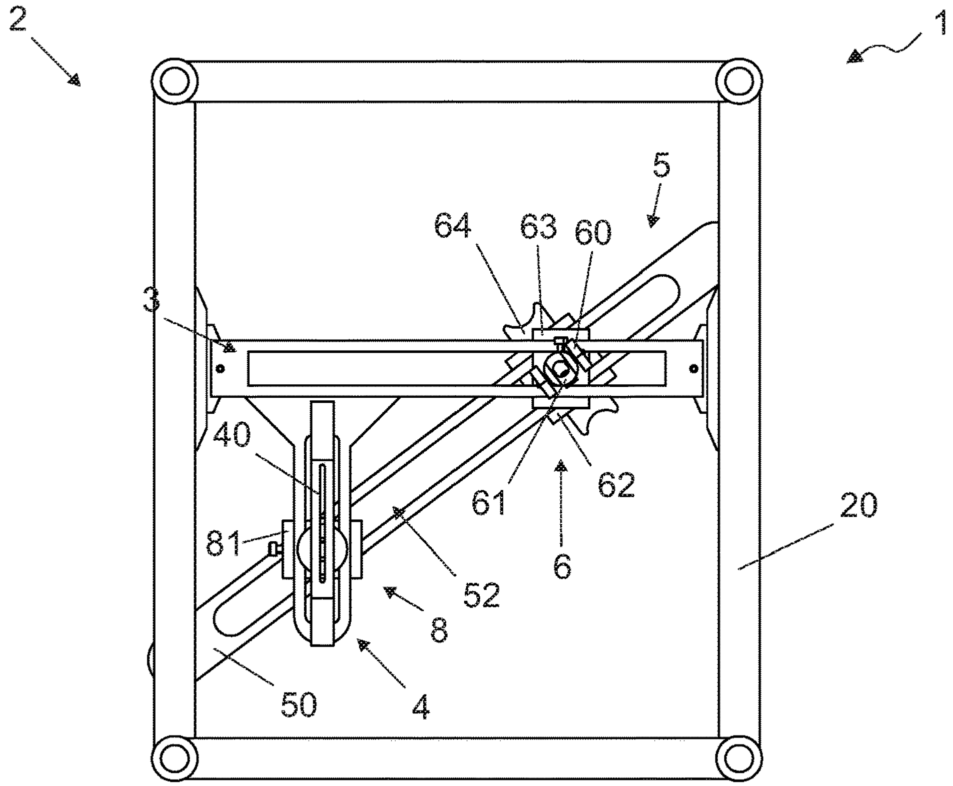
Figure 9A:
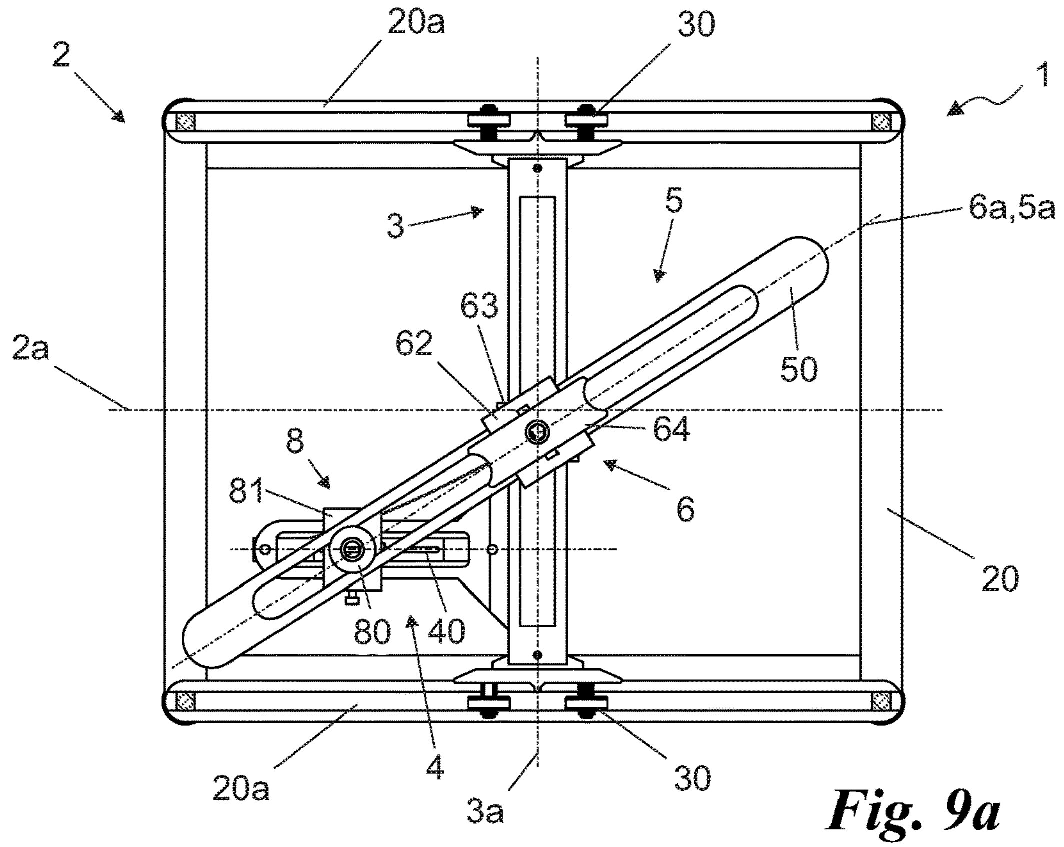
Figure 9B:
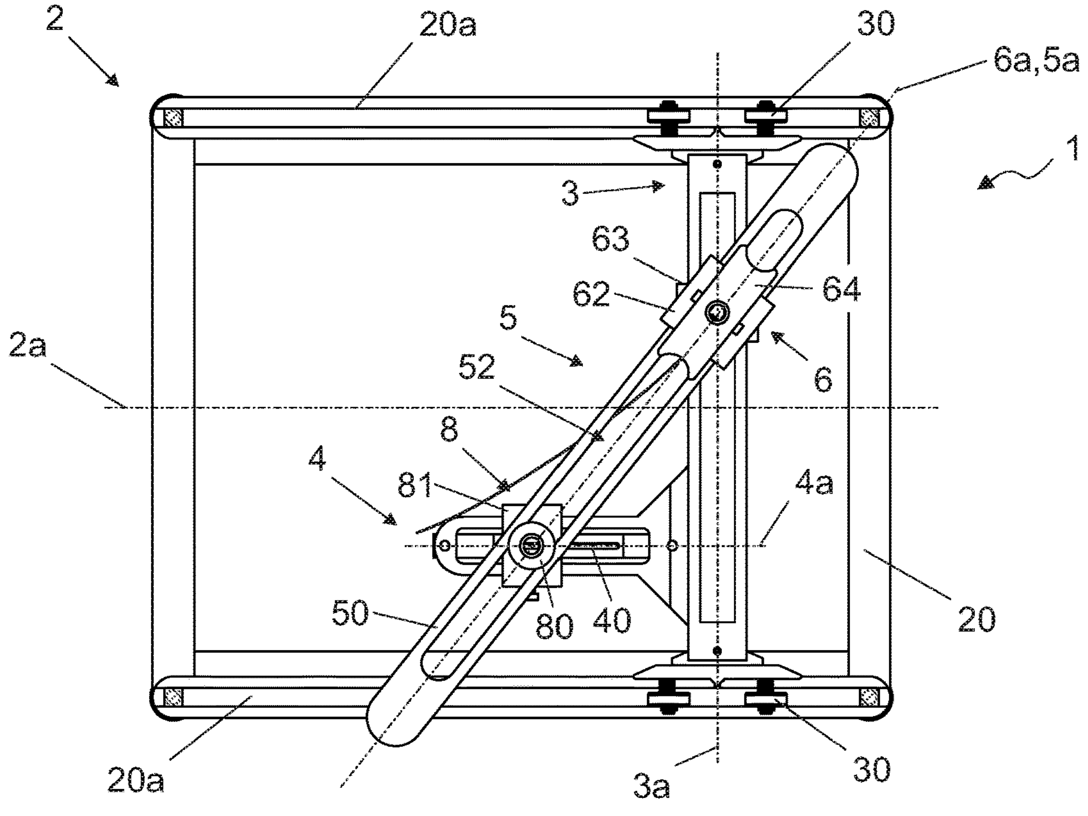
Figure 10A:
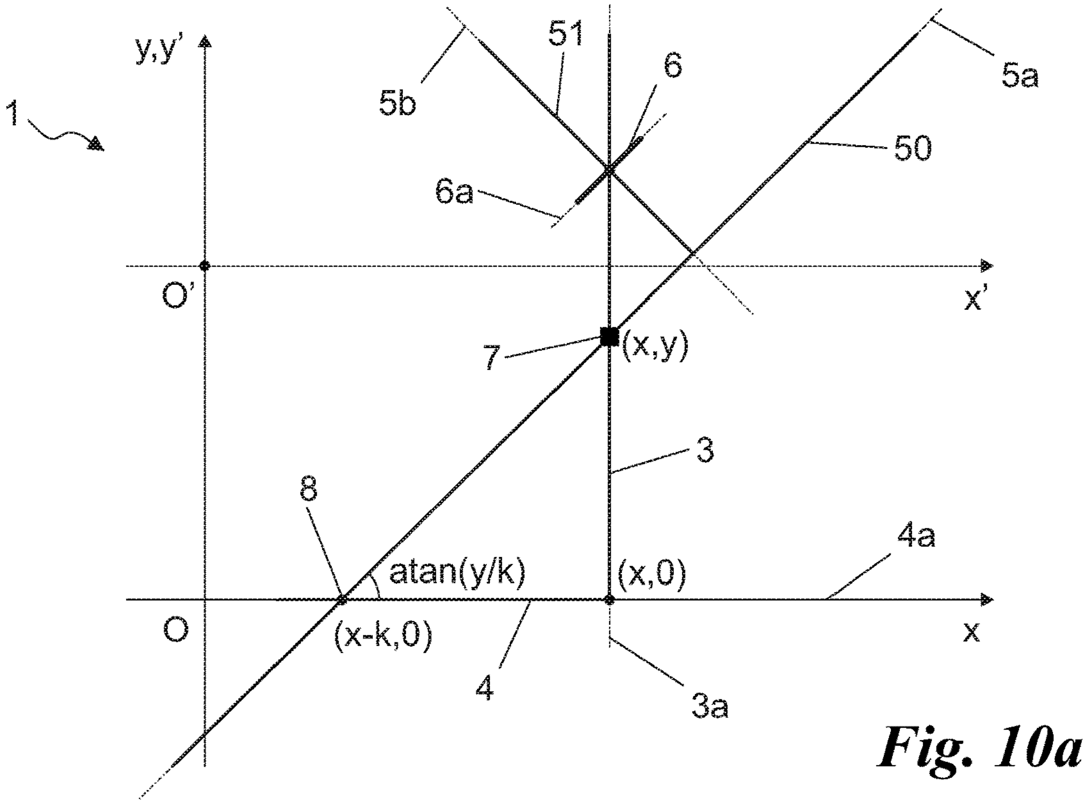
Figure 10B:
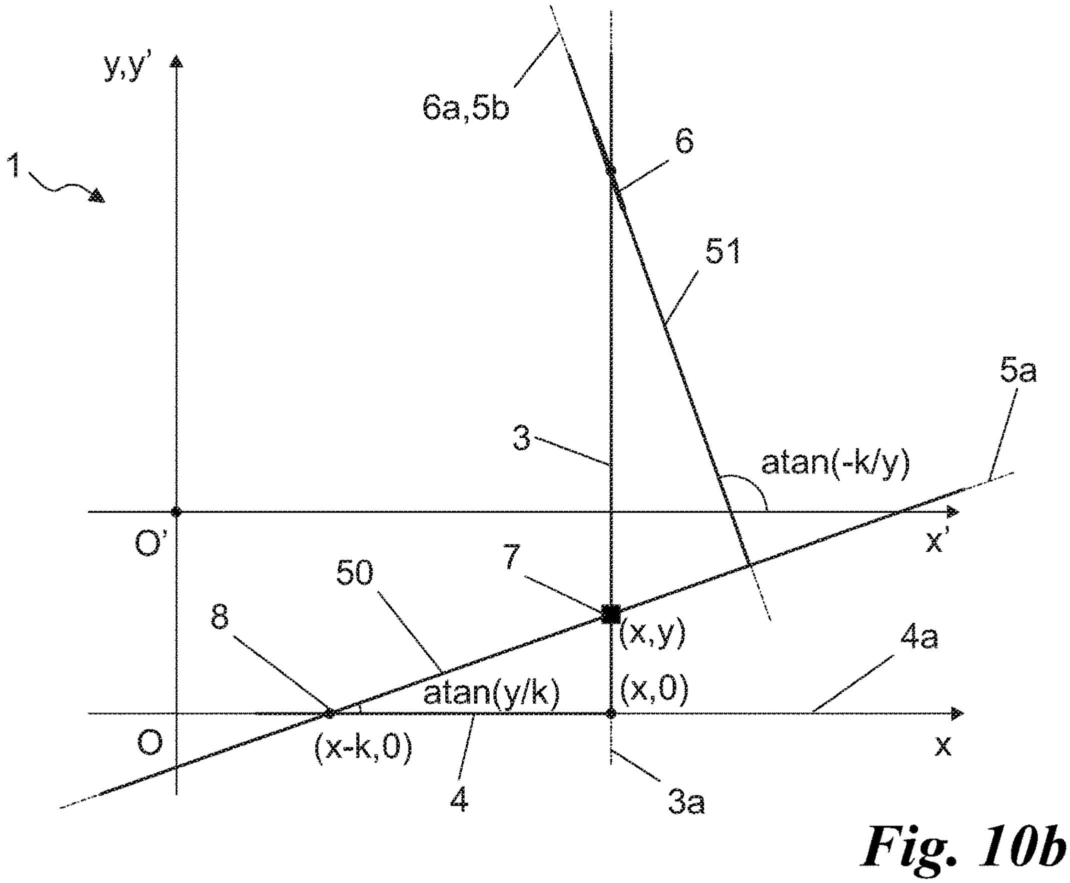

The features and advantages of the invention are hereinafter clarified by the detailed description of preferred embodiments of the invention, with reference to the appended drawings, in which:

the FIG. 1 illustrates a perspective view of a multi-purpose analogue device for tracing curves and geometric transformations according to the invention in a second configuration and second setting suitable for tracing the graph of a primitive;

the FIG. 2*a* illustrates a top view of the device of FIG. 1;

the FIG. 2*b* is a front view of the device of FIG. 1;

the FIG. 2*c* is a side view of the device of FIG. 1;

the FIG. 2*d* illustrates a bottom view of the device of FIG. 1;

the FIG. 3 illustrates a perspective view of a multi-purpose analogue device for tracing curves and geometric transformations according to the invention in a second configuration and first setting suitable for tracing the graph of an inverse function;

the FIG. 4*a* is a top view of the device of FIG. 3;

the FIG. 4*b* is a front view of the device of FIG. 3;

the FIG. 4*c* illustrates a side view of the device of FIG. 3;

the FIG. 4*d* illustrates a bottom view of the device of FIG. 3;

the FIG. 5 is a perspective view of a multi-purpose analogue device for tracing curves and geometric transformations according to the invention in a first configuration and first setting suitable for tracing the graph of an exponential function tract;

the FIG. 6*a* shows a top view of the device of FIG. 5;

the FIG. 6*b* illustrates a front view of the device of FIG. 5;

the FIG. 6*c* illustrates a side view of the device of FIG. 5;

the FIG. 6*d* is a bottom view of the device of FIG. 5;

the FIG. 7 depicts a perspective view of a multi-purpose analogue device for tracing curves and geometric transformations according to the invention in a first configuration and second setting suitable for tracing the graph of a parabola function section;

the FIG. 8*a* shows a top view of the device of FIG. 7;

the FIG. 8*b* illustrates a front view of the device of FIG. 7;

the FIG. 8*c* is a side view of the device of FIG. 7;

the FIG. 8*d* represents a bottom view of the device of FIG. 7.

the FIG. 9*a* illustrates a top view of the device of FIG. 5 in which the guides and the first slider is in a first position;

the FIG. 9*b* illustrates a top view of the device of FIG. 5 in which the guides and the first slider is in a second position;

the FIG. 10*a* is a schematic diagram of an analogue multi-purpose curve tracing and geometric transformation device according to the invention in a second configuration and second setting; and the FIG. 10*b* is an operation diagram of a multi-purpose analogue device for tracing curves and geometric transformations according to the invention in a second configuration and first setting.

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

Furthermore, unless otherwise indicated, the terms "perpendicular", "transverse", "parallel" or "normal" or other terms of geometric positioning between geometric elements (e.g. axes, directions and straight lines) are to be understood by reference to their reciprocal geometric position between the corresponding projections. These projections are defined on a single plane parallel to the plane(s) of location of said geometric elements.

With reference to the Figures, the multi-purpose analogue device for tracing curves and geometrical transformations according to the invention is globally referred to by the number 1.

The device 1 is a device usable manually by the user and is, in particular, capable of allowing graphing of tracts of functions, preferably exponentials and parabolas, and related analytical and geometrical transformations, such as inverse functions, primitives from integration and derivatives of functions.

Therefore, device 1 is capable of interacting with a tracing plane.

The tracing plane may comprise any surface, preferably flat or negligibly curved, on which a mark can be made.

Thus, the surface can be determined by a sheet of paper resting on a plane, e.g. of a bench.

The mark can also be made by means of tracing media. The tracing media can be of any type and may also depend on the type of tracing plane with which they interact. In one example, the tracking means may include a pencil, stylus or other graphic means capable of leaving a mark, erasable or indelible, on the tracking plane.

The device 1 may therefore preferably comprise a support 2.

The support 2 is substantially a component capable of allowing the device 1 to rest on the tracing plane. The support 2, therefore, allows a expansion direction 2*a* to be defined.

The expansion direction 2*a* is substantially a direction along which the other components of the device 1 can translate with respect to the support 2, as further explained below.

The support 2 may include a frame 20.

The frame 20 is stably supported on the plane. Therefore, the frame 20 preferably defines at least one stable support point with respect to the plane itself. Even more in detail, the frame 20 may define a rectangular frame shape. Therefore, it may define, in particular, at least three support points to the plane, suitably four support points, at the vertices of the frame. Furthermore, the support points may be formed by legs including support portions to the plane including high friction material, possibly rubber, to increase the stability of the contact between the frame 20 and the plane.

The frame 20 preferably includes one or more fifth guides 20*a*.

The fifth guide 20*a* defines and preferably extends along a sliding axis preferably parallel to the expansion direction 2*a*. If present, the fifth guide 20*a* may substantially correspond to a rail within which other components may move in a controlled manner.

In essence, the fifth guide 20*a* defines a path along a direction parallel to the expansion direction 2*a*. If the frame 20 is defined by a frame, the fifth guide 20*a* may be positioned at one side of the frame 20. Alternatively, the frame 2 may comprise two fifth guides 20*a* arranged at opposite sides of the frame 20 so as to substantially realise a track.

The device 1 comprises at least one first guide 3. The first guide 3 is substantially a movable element with respect to the tracking plane. In particular, the first guide 3 is movable with respect to the plane parallel to a predetermined direction.

Furthermore, the first guide 3 defines and preferably extends along a first translation axis 3*a*.

The translation axis 3*a* is substantially an axis extending along a straight trajectory.

Furthermore, the first translation axis 3*a* is perpendicular to the predetermined direction.

In a preferred embodiment, the device 1 comprises both the first guide 3 and the support 2.

Thus, in this form of embodiment the expansion direction 2*a* is substantially parallel to, or coincides with, the predetermined direction; and the first guide 3 may be movable relative to the support 2 parallel to, or along, the expansion direction 2*a*.

Preferably, the first guide 3 also comprises movement means 30.

The movement means 30 are configured to allow movement of the first guide 3 along the predetermined direction and/or along the expansion direction 2*a*.

Thus, the movement means 30 may comprise one or more wheels, or other equivalent elements, oriented to allow movement of the first guide 3 along a direction perpendicular to the predetermined direction and/or along the expansion direction 2*a*.

Preferably, the movement means 30 are arranged at opposite ends of the first guide 3 along the first translation axis 3*a*.

Thus, in a preferred embodiment, the movement means 30 may be connected to the one or more fifth guides 20*a* so as to allow the first guide 3 to be moved along the expansion direction 2*a* relative to the frame 20.

The fifth guides 20*a* may also be provided with a graduated scale, and the first rail 3 may comprise a pointer configured to be moved along the graduated scale when the first rail 3 moves relative to the support 2.

The pointer, if present, is preferably included at least one end of the first guide 3.

Of course, in an alternative embodiment, the device 1 could also be without support 2.

Thus, the movement means 30 could be configured to allow movement of the first guide 3 along the tracking plane. Thus, the movement means 30 could be configured to interact with the plane, i.e. to contact the plane itself.

In this case, it is preferable that the movement means 30 contact the plane at least two contact points. For example, the two contact points may be realised by two coaxial wheels. In a preferred, but not exclusive embodiment, the movement means 30 could define four contact points. For example, the four points of contact may be realised by four wheels, or two or more groups of wheels for example each consisting of a pair of coaxial wheels, arranged mirror-like two by two with respect to the expansion direction 2*a*.

From a structural point of view, the first rail 3 can be realised in various ways.

For example, the first guide 3 may be realised by a simple rod extending along the first translation axis 3*a*. Or, the first guide 3 may include a rod extending along the first translation axis 3*a* on which a track, i.e. a groove, is formed within which one or more other elements may be moved.

In addition, the first guide 3 could also be realised by a plate element, substantially a flat carriage, on which a track extending along the first translation axis 3*a* is obtained.

The device 1 also comprises a second guide 4.

The second guide 4 is preferably integral with the first guide 3. Furthermore, the second guide 4 defines and preferably extends along a second translation axis 4*a*. The second translation axis 4*a* is also an axis extending along a straight trajectory.

The second translation axis 4*a* is advantageously perpendicular to the first translation axis 3*a*. Thus, the second guide 4 is substantially transverse to the first guide 3 and intersects the latter preferably at the point of mutual constraint.

The second guide 4 is, even more in detail, preferably removably integrally constrained to the first guide 3. Therefore, the second guide 4 can be connected to and disconnected from the first guide 3.

To realise the removable constraint, the first guide 3 may comprise, for example, a slot 31.

The slot 31 may then be configured to accommodate at least part of one end of the second guide 4. The latter may be provided with suitable constraining elements to enable the second guide 4 to be engaged in the slot 31.

Suitable constraining elements may be, for example, expandable snap-fit elements within the slot 31, or elastic elements, or even fixed connecting elements such as screws or other equivalent elements.

In addition, magnetic restraining elements can also be provided, for example by making part of the end of the second rail 4 with ferromagnetic material and including a permanent magnet within the slot 31, or vice versa.

The first guide 3, moreover, preferably includes two slots 31 arranged substantially mirror-like with respect to the first translation axis 3*a*. In this way, it is possible to constrain the second guide 4 solidly to the first guide 3 on one side, or on the opposite side, of the same first guide 3. This allows, therefore, to realise various transformations, for example integration transformations, as shown in FIGS. 1-2*d* and, varying the side, inversion transformations, as shown in FIGS. 3-4*d*.

The second guide 4, from a structural point of view, can also be realised in different ways.

For example, the second guide 4 may be realised by a simple rod extending along the second translation axis 4*a*. Or, the second guide 4 may include a rod extending along the second translation axis 4*a* on which a track, i.e. a groove, is formed within which one or more other elements may be moved.

In addition, the first guide 3 could also be realised by a plate element, substantially a flat carriage, on which a track extending along the second translation axis 4*a* is obtained.

In one embodiment, the first guide 3 and the second guide 4 could be in one piece. For example, they could be made sections of an L-shaped or T-shaped element. Or the guides 3, 4 could be realised as tracks on the same plate element or plate carriage.

Preferably, the second guide 4 also includes an indicator 40.

The indicator 40 is configured to allow alignment of the second translation axis 4*a* with a straight line. Thus, the indicator 40 may be realised by a simple slot extending along part of the second translation axis 4*a* capable of being superimposed on a straight line. Alternatively, the indicator 40 could also be an active device capable of projecting a line or section of the second translation axis 4*a* onto the tracing plane. Alternatively, the indicator 40 could also be constrained to the frame 20 and thus be integral with it and not integral with the second guide 4.

The second guide 4 is, moreover, preferably configured to allow the binding of another element.

The device 1 may, in fact, comprise a fastening element 8.

If present, the fastening element 8 is constrained in a resolvable way integral to the second guide 4. This means that the fastening element 8 can be coupled and uncoupled to the second guide 4 at will.

In addition, the second guide 4 and the fastening element 8 can be configured to allow for mutually integral constraint at different positions along the second translation axis 4*a*.

For example, the second guide 4 may comprise a plurality of holes distributed along the second translation axis 4*a*. The holes may optionally be equidistant from each other.

Or, the fastening element 8 may be continuously translatable on command, and permanently fixable at any position along the second guide 4 so as to allow any distance from the first guide 3 to be defined.

Thus, the fastening element 8 may comprise fourth coupling means 81.

If present, the fourth coupling means 81 are configured to stably constrain the fastening element 8 on the second guide 4. In this regard, the fourth coupling means 81 may comprise a support portion configured to rest on the second guide 4 and a pin passing through the support portion to enter the bore so as to obstruct the mutual movement between the fastening element 8 and the second guide 4 along the second translation axis 4*a*.

In addition, on the second guide 4, the distance between the clamping element 8 and the first guide 3 can be set by the user prior to drawing the curve, by means of a special set of notches drawn along the second translation axis 4*a*, similar conceptually to those on a ruler, which can serve to read this distance.

Similar notches could also be drawn on the first guide 3 along the first translation axis 3*a* in such a way that, if the second guide 4 represents abscissa coordinates, the first guide 4 can indicate ordinate coordinates.

Device 1 also includes a connector 5.

The connector 5 is configured to be connected to guides 3, 4. In this way, the connector 5 can globally move in relation to movements imposed on the guides 3, 4.

In particular, the connector 5 comprises at least one third guide 50.

The third guide 50 defines and preferably extends along a third translation axis 5*a*. The third translation axis 5*a* is also an axis extending along a straight trajectory.

From a structural point of view, the third guideway 50 may be realised in various ways.

For example, the third guide 50 may be realised by a simple rod extending along the third translation axis 5*a*. Or, the third guide 50 may comprise a rod extending along the third translation axis 5*a* on which a first sliding track 52, i.e. a groove, is formed within which one or more other elements may be moved.

In addition, the third guide 50 could also be realised by a plate element, substantially a flat carriage, on which is obtained a track extending along the third translation axis 5*a*.

In particular, the third guide 50 is constrained in a compliant way to the second guide 4 in such a way that the third guide 50 is roto-translatable with respect to the second guide 4.

In a preferred embodiment, to realise this constraint, the fastening element 8 may be constrained in a compliant way to the third guide 50.

Furthermore, the fastening element 8 may translate along the third translation axis 5*a*.

In other words, the third guide 50 may translate relative to the fastening element 8 along the third translation axis 5*a*. In addition, the third guide 50 can also rotate about the fastening element 8. Thus, the latter essentially acts as a pivot for the third guide 50 and the latter can roto-translate relative to the second guide 4 via the fastening element 8.

The device 1 also comprises a first slider 6.

The first slider 6 is a movable element. In particular, the first slider 6 is an element whose mobility is limited by other elements.

In particular, the first slider 6 is labile constrained to the first guide 3 and mobile along the first translation axis 3*a*.

To ensure this mobility, the first slider 6 may include second coupling means 63.

The second coupling means 63 may be similar, conceptually, to the fourth coupling means 80. Thus, the second coupling means 63 comprise at least one support portion, for example U-shaped, suitable to embrace at least part of the first guide 3 so as to allow exclusively the translation of the first slider 6 along the first translation axis 3*a* with respect to the first guide 3.

Of course, the second coupling means 63 may vary depending on how the first guide 3 is realised. For example, if the first guide 3 includes a groove, the second coupling means 63 may include a simple support portion provided with a fin adapted to translate within the groove along the first translation axis 3*a*.

Essentially, the second coupling means 63 define a sleeve structure.

The first slider 6 further comprises further elements.

Preferably, it comprises first movement means 60.

The first movement means 60 are configured to allow movement of the first slider 6. In particular, the first movement means 60 allow the first slider 6 to move in the plane along a movement direction 6*a*.

The movement direction 6*a* is substantially the direction of motion imposed by the first movement means 60. The movement direction 6*a* is fixed with respect to the first slider 6, but is variable with respect to the other components of the device 1, for example the first guide 3.

By this is meant that the first slider 6 is intended, during use of the device 1, to vary its orientation, thereby varying the direction of movement 6*a*, however the direction of movement 6*a* is predetermined with respect to the first slider 6, i.e. the first movement means 60 do not rotate, and therefore do not vary, the direction of movement 6*a* with respect to, for example, the second coupling means 63.

Furthermore, the first slider 6 also comprises support means 61.

The support means 61 are substantially configured to support, in contact with the plane, the tracking means. As mentioned above, the tracking means are suitable for drawing a mark on the plane during use of the device 1 and, in detail, during movement of the first slider 6.

Furthermore, the support means 61 may also be configured simply to track a mark on the plane. For example, the chasing may be enabled by an eyelet or hole that allows the movement means 60 to observe the progress with respect to a curve or other sign on the plane.

In fact, for example, the support means 61 may comprise a sleeve within which a tracking device, possibly a pencil, pen, or even a simple pencil lead or other object may be inserted to make a mark and which, once freed from the tracking means, may act as an eyelet for tracking graphs.

Advantageously, connector 5 also includes a fourth guide 51.

The fourth guide 51 is substantially adapted to allow functional conversion of the device 1.

The fourth guide 51 defines and preferably extends along a fourth translation axis 5*b*.

The fourth translation axis 5*b* is also an axis extending along a straight trajectory.

From a structural point of view, the fourth guideway 51 may be realised in various ways.

For example, the fourth guide 51 may be realised by a simple rod extending along the fourth translation axis 5*b*. Or, the fourth guide 51 may comprise a rod extending along the fourth translation axis 5*b* on which a second sliding track 53, i.e. a groove, is formed within which one or more other elements may be moved.

In addition, the fourth guide 51 could also be realised by a plate element, substantially a flat carriage, on which is obtained a track extending along the fourth translation axis 5*b*.

The fourth guide 51 is thus constrained integral, or integral, to the third guide 50.

Fourth and third guides 51, 50 are mutually constrainable, or constraining, such that the translation axes 5*a*, 5*b* are mutually perpendicular.

In a preferred form of embodiment, the fourth guide 51 is removably constrained to the third guide 50. Thus, the latter may include a seat to which the fourth guide 51 may be suitably engaged, by interlocking, external constraining means, or by elastic or magnetic coupling means.

Or, in an alternative embodiment, the third and fourth guides 50, 51 may be two mutually constrained rods in one piece. Or again, the third and fourth guides 50, 51 could be realised by a flat support, partially resting on the first and second guides3, 4 on which the first and second sliding tracks 52, 53 are formed.

In any case, preferably, the connector 5, and thus also the third and/or fourth guide tracks 50, 51 are preferably offset from the first and second guide tracks 3, 4, i.e. extend along a plane offset from the extension plane of the guide tracks 3, 4.

Advantageously, irrespective of the form of embodiment, the fourth guide 51 may allow for at least a first configuration and a second configuration of the device 1.

In the first configuration, the first slider 6 is constrained in a compliant way not only to the first guide 3, but also to the third guide 50. Thus, the first slider 6 is translatable along the third translation axis 5*a* so as to constrain in a compliant way the third guide 50 to the first guide 3.

In the first configuration, the fourth guide 51 may also be unused if it is integrally constrained to the third guide 50, or preferably the fourth guide 51 may be removed if it is removably constrained to the third guide 50 to increase the visibility of the tracking plane from the top of the device 1.

Or again, in the first configuration, the fourth guide 51 may be used in conjunction with a pointer, as further specified below.

In the second configuration, the first slider 6 is constrained in a compliant way not only to the first guide 3, but also to the fourth guide 51. Furthermore, the first slider 6 is translatable along the fourth translation axis 5*b* so as to constrain in a compliant way the fourth guide 51 to the first guide 3.

In particular, the constraint between the first slider 6 and the third or fourth guide 50, 51 does not allow mutual rotation between the first slider 6 and the third guide 50 and/or between the first slider 6 and the fourth guide 51.

In fact, preferably, the first slider 6 also comprises first coupling means 62.

The first coupling means 62 are configured to connect the first slider 6 to the third guide 50 or the fourth guide 51 by obstructing their mutual rotation.

In order to obstruct rotation, of course, various embodiments may be adopted. For example, the first coupling means 62 may include a coupling portion embracing the third guide 50 or the fourth guide 51 by realising a sleeve structure. Or, the first coupling means 62 may include a pivot equipped with edges capable of translating, without being able to rotate, within the first or second sliding track 52, 53. The latter configuration is preferable.

Furthermore, advantageously, the first slider 6 is constrained to the third slide track 50 or the fourth slide track 51 in a switchable manner between a first setting and a second setting.

Alternatively, the first spool 6 may be provided with a snap-action, or elastic, mechanism which allows the first coupling means 52 to be disengaged on command from the third or fourth rails 50, 51 and which, when the first spool 6 is not manipulated, automatically returns the first coupling means 52 to the engaged state.

In any case, in the first setting, the movement direction 6*a* is aligned, if one is in the first configuration, with the third translation axis 5*a* as clearly shown in FIGS. 5-6*d* or, if one is in the second configuration, with the fourth translation axis 5*b*, as shown in FIGS. 3-4*d*.

In the second configuration, the movement direction 6*a* is perpendicular, if one is in the first configuration, to the third translation axis 5*a* as shown clearly in FIGS. 7-8*d* or, if one is in the second configuration, to the fourth translation axis 5*b*, as shown clearly in FIGS. 1-2*d*.

The first slider 6 could also be configured to allow a rotation of an arbitrary angle between the movement direction 6*a* and the third or fourth guide 50, 51 on which the first slider 6 slides.

Thus, the conformation of the first slider 6 allows for substantially varying the starting movement direction 6*a*, through which motion is imposed on the tracking means in relation also to all relative movements between the guides 3, 4, 50, 51 which will also tend to vary the movement direction 6*a* during tracking, as clearly shown in FIGS. 9*a*-9*b*.

In order to facilitate the switching of the first slider 6 and also to increase the stability of the device and favour the tracking means, the first slider 6 may also include a handle 64.

The handle 64, if present, is configured to allow the user to move the first slider 6.

Eventually, the handle 64 may also allow the user to move the first movement means 60, for example to follow a graph on the plane when the first slider 6 is configured to follow a mark on the plane instead of tracing a graph. Thus, the handle 64 preferably runs predominantly along the movement direction 6*a*.

In this way, the handle 64 is also able to provide an indication of the direction of the first movement means 60 since the visibility of the latter is limited by the presence of the guides 3, 50, 51 placed on it.

The device 1 may, in addition, comprise a second slider 7.

The second slider 7 is substantially similar to the first slider 6. However, the second slider 7, if present, is advantageously configured to be moved relative to a mark on the plane. In other words, the second slider 7 may allow a sign on the drawing plane to be chased, for example a graph already drawn thereon, substantially acting as a chaser.

In fact, the second slider 7 is particularly useful for realising configurations of the device 1 in which a starting graph is to be transformed.

Therefore, the second slider 7 may comprise pointing elements, for example at least one through-hole, which allows observing the tracking of the sign of an underlying graph, or also other more complex pointing elements, possibly active, optical and capable of projecting a pointer sign onto the tracking plane.

The pointer of the second slider 7 may be similar to the support means 61 and may therefore also be capable of supporting tracking means. Therefore, the second slider 7 may also be configured to draw a sign on the plane.

Structurally, the second slider 7 is constrained in a compliant way to the first guide 3.

Furthermore, the second slider 7 is movable along the first translation axis 3*a*. Thus, the second slider 7 is also constrained in a compliant way to the third guide 50 in the second configuration.

Thus, the second slider 7 is movable along the third translation axis 5*a* in the second configuration so that the third guide 50 can roto-translate relative to the first guide 3.

The second slider 7, like the fastening element 8, thus allows the third guide 50 to rotate with respect to the second slider 7.

Therefore, the second slider 7 may also include a pivot around which the third guide 50 may rotate.

In further detail, the second slider 7 includes first coupling means 70.

The first coupling means 70 are substantially resolvable.

Furthermore, they are configured to connect the second slider 7 to the third guide 50.

The first engagement means 70 may comprise at least the previously mentioned pivot and a cap capable of preventing second slider 7 and third guide 50, or fourth guide 51, from translating mutually perpendicular to the tracking plane.

The fastening element 8 may also conclude a similar structure. Therefore, the fastening element 8 may also include second coupling means 80.

The second attachment means 80 are substantially resolvable.

Furthermore, they are configured to connect the fastening element 8 to the third guide 50.

The second engagement means 80 may substantially comprise at least one pivot and a cap capable of preventing the third guide 50 and the fastening element 8 from translating mutually perpendicular to the tracking plane.

In any case, the coupling means 70, 80 are both configured to allow the constraint to be resolved so as to facilitate the realisation of the different configurations of the device 1.

In conclusion, the second slider 7 preferably also comprises third coupling means 71.

The third coupling means 71 may be similar, conceptually, to the second coupling means 63. Thus, the third coupling means 71 comprise at least a support portion, for example U-shaped, suitable to embrace at least part of the first guide 3 so as to allow exclusively the translation of the second slider 7 along the first translation axis 3*a* with respect to the first guide 3.

Of course, the third coupling means 71 may also vary depending on how the first guide 3 is realised. For example, if the guide 3 includes a groove, the third coupling means 71 may include a simple support portion provided with a flipper capable of translating within the groove along the first translation axis 3*a*.

Essentially, the third coupling means 71 define a sleeve structure.

The operation of the multi-purpose analogue device for tracing curves and geometric transformations 1 described above in structural terms is as follows.

The device 1 is placed on the tracing plane on which to trace. The plane on which to trace can be a sheet of paper, a blackboard, a tablet or a graphics tablet, varying specifically the means of tracing, i.e. the tracing tool such as pen, pencil, chalk, felt-tip pen, digital graphic pen or other.

If a line is already drawn on the plane, device 1 can be placed on the plane in such a way as to align the second guide 4 with the drawn line, e.g. by superimposing indicator 40 on the drawn line.

Essentially, therefore, the second translation axis 4*a* defines the direction of the abscissa.

The first guide 3 can translate parallel to the direction of the abscissa, i.e. parallel to the second translation axis 4*a*. The translation can occur cartesianally by means of the frame 20, in detail by means of the fifth guides 20*a*, or by means of the movement means 30 resting on the tracking plane and defining the predetermined direction of movement parallel to the second translation axis 4*a*.

Along the first guide 3 the first slider 6 can slide, together with the second slider 7 or alone, depending on whether the device 1 is configured to draw a curve or to perform a geometric transformation or only to draw a graph.

The first slider 6 can guide the tracing means to draw a mark on the tracing plane. The second slider 7 can guide a pointer configured to follow a graph of a function already present on the tracing plane so as to consequently guide the first slider 6 in drawing the trace.

Naturally, the tracking means can equivalently be placed on the first slider 6 or the second slider 7, so different modes of operation can be realised, as already mentioned.

In a first mode, the first slider 6, in detail via the support means 61, includes the tracking means and tracks while the second slider 7 tracks. In a second manner, the first slider 6 tracks, driving the movement means 60 via the handle 64, and the second slider 7, in detail via the pointer, includes the tracking means and tracks the graph.

Or, since the first slider 6 and the second slider 7 define at least in part a similar structure, some elements, including for example the support means 71 and the pointer, may be disassemblable and interchangeable between the sliders 6 and 7.

Thus, in general, the functionality of first and second sliders 6, 7 could be reversed, allowing the first slider 6, e.g. constrained to the fourth guide 51, to act as a pointer or tracker and the second slider 7 to support tracking means for drawing a graphical mark on the plane.

In this regard, therefore, support means 71 and pointer could also be constrained to the respective slider 6 and/or 7 by means of simple elements such as a pressure screw. Some elastic elements may also be provided to ensure adhesion of the tracing means to the writing plane, for example springs pushing such means from the support means 71.

On both the first slider 6 and the second slider 7, constraint may be imposed on the third guide 50 or the fourth guide 51. The constraint to a guide 50, 51 implies the possibility of sliding along it.

Furthermore, being able to vary the direction of movement 6*a* by 90° is a simple but fundamental aspect of the invention. In fact, the structure of the first slider 6 makes it possible to avoid the replacement of components to switch between the various configurations of the device 1, i.e. to the various functionalities, only having to change the relative position of the components, which are designed to be compatible with all configurations.

Since the second slide 4 is fixed to the first slide 3 with an interlocking mechanism, this allows the entire device 1 to be, when not in use, detachable and foldable to occupy less space.

When there are two sliders 6 and 7 on the first guide 3, the position of sliders 6 and 7 is relative to two different Cartesian axis systems with the same abscissa, as visible in FIGS. 10*a*-10*b* with the coordinates Oxy and O'x'y', defined for example by notches on the fifth rail 20*a*, but different ordinates, defined for example by notches on the first guide 3.

By introducing two different systems of indentations for the coordinates relative to the ordinates, for example on both sides, mirroring the first translation axis 3*a*, of the first guide 3 so as to have the origin at different heights of the first guide 3, the sliders 6 and 7 may indicate one or the other system of indentations by each including a marker pointing to a respective side including the indentations.

Thus, the device 1 may comprise in this regard a plurality of notches distributed at least one side of the first guide 3, possibly on both opposite sides with respect to the first translation axis 3*a*, parallel to the first translation axis 3*a* and configured to indicate one or more ordinate values; Thus, the first slider 6, and possibly also the second slider 7, may comprise a marker facing the side of the first guide 3 including the notches so as to point towards one of them when moving along the translation axis 3*a* so as to indicate a corresponding ordinate value.

The device 1 traces from an initial position, which is defined by placing the first movement means 60 in contact on the tracing plane. This initial position can be defined by lifting device 1 and placing it in contact on the tracking plane at the desired position to begin tracking or tracing.

The curves that the instrument allows to be plotted are basically exponential and parabola. In both cases the first slider 6 is bound to first guide 3 and third guide 50. The third guide 50 is also bound to fastening element 8 and is therefore labile bound to the second guide 4, defining an articulated triangle whose vertices are given respectively by fastening element 8, intersection of guides 3 and 4, and first slider 6.

To reproduce exponential graphs, the direction of movement 6*a* is aligned with the third translation axis 5*a*.

The exponentials are plotted considering that these curves have a constant subtangent, defined by the distance of the centre of the fastening element 8, acting as a pivot, from the first guide 3.

Consequently, the second translation axis 4*a* is aligned with the asymptote of the exponential.

In addition, it is of course possible to draw a logarithmic function simply by rotating the device 1 about an axis perpendicular to the tracing plane.

For parabolic graphs, the direction 6*a* is perpendicular to the third translation axis 5*a*.

For the parabola, it is considered that the distance of the centre of the fastening element 8, acting as a pivot, from the first guide 3 corresponds to the constant sub-normal defining the parabola.

Consequently, the second translation axis 4*a* is aligned with the axis of the parabola.

The transformations that device 1 permits to obtain are the derivative and the primitive, passing through an initial position and given an integration constant, of a plotted function or of the inverse of a plotted function multiplied or divided by the distance k of the centre of the fastening element 8 with respect to the first guide 3. Unlike the previous curves, in this case it is necessary to introduce on the first guide 3 not only the first slider 6, but also the second slider 7.

One of the two sliders 6 and 7 is then moved to follow the function already available while the other performs the transformation. To draw the primitive, the second slider 7 follows the function, while the first slider 6 draws the primitive.

For the derivative, the first slider 6 and the second slider 7 are reversed, or the constraint means 61 are moved to the second slider 7 and the pointer is moved to the first slider 6.

If to move the second slider 7 it is sufficient to move the slider along the traced curve, to move the first slider 6 it is also necessary to appropriately impose the direction of its wheels which, to follow the trace, are oriented as the tangent to the trace at that point by, for example, the handle 64. The Cartesian axes relative to the derived function are the second translation axis 4*a*, which defines the abscissa, and the first translation axis 3*a*, which defines the ordinate.

For the primitive function, the first translation axis 3*a* defines the ordinate, but the abscissa axis is determined by any line parallel to the second translation axis 4*a*.

As for the inverse function, the third guide 50 commits to the fastening element 8 and the second slider 7, while the second guide 4 commits to the first slider 6.

The coordinates (x,0) determine the position of the intersection between the first guide 3 and the second guide 4 with respect to the reference system with abscissa given by the second translation axis 4*a* and ordinate given by the first translation axis 3*a* at the point of abscissa 0 indicated preferably on the fifth guide 20*a*. In the same reference system, the centre of the fastening element 8 is, therefore, defined by the coordinates (x−k,0), where k can also be negative.

With reference to FIG. 10*a*, if the movement direction 6*a* is perpendicular to the fourth translation axis 5*b*, and therefore aligned with the third guide 50, the angle formed between the direction of movement 6*a* and the abscissae, i.e. the second translation axis 4*a*, is tan−1(y/k).

Therefore, the curve defined by the position of the tracking means connected to the first slider 6 integrates y/k. To exactly plot a primitive of y=f(x), it is sufficient to take k=1, i.e. the length of the unit to be considered. The constant of integration is, in particular, defined by the initial position of the first slider 6, in fact to draw the integral from a to x of f(x) it is necessary to position the first slider 6 at (a,0) in the reference system of the integral O'x'y'.

With reference to FIG. 10*b*, if the direction of movement 6*a* is aligned with the fourth translation axis 5*b*, and therefore perpendicular to the third translation axis 5*a*, the angle formed between the direction of movement 6*a* and the abscissae, i.e. the second translation axis 4*a*, is $\tan^{-1}(-k/y)$. In particular, if we consider k=−1, where the centre of the fastening element 8 is one unit to the right of (x,0), we obtain that the position of the first slider 6, in detail of the tracking means, integrates 1/f(x), and thus integrates the inverse function of y=f(x). Again, the integration constant is defined by the initial position of the first slider 6.

The multi-purpose analogue device 1 for tracing curves and geometric transformations according to the invention achieves important advantages.

In fact, the multi-purpose analogue device 1 for tracing curves and geometric transformations enables both the tracing of functions, in this case at least exponentials and parabolas, and the tracing of transformations such as inverses, integrals and derivatives.

Furthermore, the device 1 is simple, intuitive and extremely practical and, therefore, can be used efficiently for educational purposes.

The device 1 is, especially but not only in the form of the realisation provided with support 2, stable and allows the graphs for which it is configured to be drawn extremely accurately.

In conclusion, the device 1 is inexpensive and provided with few components which are, moreover, easily assembled and disassembled with the consequence that, in addition to the preceding advantages, the device 1 also allows it to be easily responded to within small spaces. The invention is susceptible to variations within the scope of the inventive concept as defined by the claims.

Within this scope, all details are substitutable by equivalent elements and the materials, shapes and dimensions can be any.

The invention claimed is:

1. Multi-purpose analogue device for tracing curves and geometric transformations comprising:

a first guide defining a first translation axis and movable on a tracing plane along a predetermined direction perpendicular to said first translation axis, a second guide integral with said first guide and defining a second translation axis perpendicular to said first translation axis, a connector configured to be connected to said guides and comprising a third guide defining a third translation axis, constrained in a compliant way to said second guide so that said third guide is roto-translatable with respect to said second guide, a first slider constrained in a compliant way to said first guide, movable along said first translation axis, and including:

first movement means configured to allow the movement of said first slider on said plane along a movement direction, and support means configured to follow a mark on said plane or to support, in contact with said plane, tracking means suitable for tracing a mark on said plane during the movement of said first slider, and wherein said connector further comprises a fourth guide defining a fourth axis and constrainable integrally to said third guide in such a way such that said translation axes are mutually perpendicular so as to allow at least:

a first configuration wherein said first slider is also constrained in a compliant way to said third guide and can be translated along said third translation axis so as to constrain in a compliant way said third guide to said first guide, and a second configuration wherein said first slider is also constrained in a compliant way to said fourth guide and translates and along said fourth translation axis so as to constrain in a compliant way said fourth guide to said first guide.

2. Device according to claim 1, wherein said first slider further comprises first coupling means configured for connecting said first slider to said third guide or said fourth guide obstructing its reciprocal rotation in a switchable way between a first setting wherein said movement direction is aligned, in said first configuration, with said third translation axis or in said second configuration, with said fourth translation axis and a second setting in which said movement direction is perpendicular to said third translation axis in said first configuration or to said fourth translation axis in said second configuration.

3. Device according to claim 2, wherein said second slider comprises first coupling means resolvable configured to connect said second slider to said third guide.

4. Device according to claim 1, further comprising a second slider configured to be moved relatively to a mark on said plane or to make a mark on said plane, constrained in a compliant way to said first guide, movable along said first translation axis and also constrained in a compliant way to said third guide and translatable along said third translation axis so that said third guide can roto-translate with respect to said first guide.

5. Device according to claim 1, comprising a fastening element constrained in a resolvable way integrally to said second guide and constrained in a compliant way to said third guide and translatable along said third translation axis so that said third guide can roto-translate with respect to said second guide.

6. Device according to claim 5, wherein said fastening element comprises second coupling means resolvable configured to connect said pointing element to said third guide.

7. Device according to claim 1, wherein said second guide comprises at least one indicator configured to allow the alignment of said second translation axis with a straight line.

8. Device according to claim 1, wherein said first slider comprises second coupling means and/or said second slider comprises third coupling means, said second and third coupling means being configured to constrain in a compliant way respectively said first slider and/or said second slider on said first guide realizing at least one support constraint.

9. Device according to claim 1, wherein said first slider comprises a handle configured to allow a user to move said first slider and extending mainly along said movement direction.

10. Device according to claim 1, comprising a support for supporting said tracking plan defining at least one expansion direction parallel to said predetermined direction and comprising a frame that can be rested on said plane and including one or more fifth guides extending parallel to said expansion direction and said first guide comprises second movement means arranged at opposite ends along said first translation axis of said first guide and connected to said one or more fifth guides in such a way as to allow the movement of said first guide along said expansion direction with respect to said frame.

11. Device according to claim 1, comprising a plurality of notches distributed parallel to said first translation axis in correspondence of two opposite sides, with respect to said first translation axis of said first guide and configured to indicate each ordinate values and said first slider and said second slider each comprise a respective indicator facing a respective said side of said first guide including said notches in such a way as to each can point towards one of said respective notches when moving along said translation axis indicating a corresponding ordinate value.

* * * * *